J. A. SMITH.
Button-Hook.
No. 208,858. Patented Oct. 8, 1878.
FIG. II.
FIG. I.
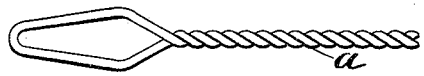
FIG. III.
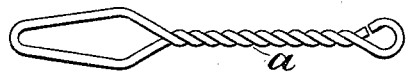
FIG. IV.
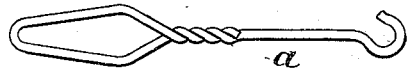
WITNESSES
J. Buckingham.
D. P. Cowl.
INVENTOR
Joseph A. Smith,
by G. H. W. & Horace
attys.
H. PETERS, PHOTO-LITHOGRAPHER, WASHINGTON, D. C.

UNITED STATES PATENT OFFICE.

JOSEPH A. SMITH, OF DEEP RIVER, CONNECTICUT.

IMPROVEMENT IN BUTTON-HOOKS.

Specification forming part of Letters Patent No. 208,858, dated October 8, 1878; application filed March 29, 1878.

*To all whom it may concern:*

Be it known that I, J. A. SMITH, of Deep River, in the county of Middlesex and State of Connecticut, have invented certain Improvements in Button-Hooks or Buttoners, of which the following is a specification, reference being made to the accompanying drawing, forming a part hereof.

My invention relates to a button-hook or buttoner formed out of a single wire, the wire being bent to the proper shape of the loop or hook, and then duplicated and twisted to form the shank. The twist alone may constitute the handle, in which case it is found to be sufficiently strong for the purpose; or the twisted shank may be inserted in a wooden, bone, or other handle. When so inserted, the shape of the twist, together with the cement, glue, or other fastening substance employed, makes a secure and permanent connection with the handle.

In the accompanying drawing, Figure 1 shows the buttoner formed out of a single wire and ready to be inserted in the handle. Fig. 2 shows the buttoner and additional handle complete. Fig. 3 represents a buttoner formed out of a single wire, the twisted part or shank, which terminates in a ring, constituting the handle. Fig. 4 represents a buttoner having two ends, one being in the form of a loop and the other in that of a hook, the whole formed from one wire and having a twisted shank.

The twisted shank is shown by *a*. The twisting is accomplished by machinery, and is perfectly regular.

The buttoners shown in Figs. 3 and 4 are well adapted for glove-buttoning; but the lightness, compactness, and cheapness of the construction seen therein recommend it for the general purposes to which a buttoner is applied.

In Fig. 4 the loop and hook serve as additional handles, each for the other respectively.

The shank of the buttoner shown in Fig. 1 has the advantage of a firm seat in the handle, which cannot be given to a shank formed by simply duplicating the wire without twisting it. For this construction I claim increased strength, both in the shank and in the attachment of the same to the handle.

An important advantage derived from the twisting of the wire is that of the preventing of the spread of the loop at the bottom or base thereof when strain is applied to the device in the act of using it. Where the wire is simply duplicated or bent over upon itself, the spreading of the loop at the point of union with the shank is liable to occur, and the symmetry and efficiency of the article are thereby impaired. This defect is completely obviated by twisting the wire, which closes the base of the loop and prevents the disengagement of the wire.

Having described my invention, I claim as new and wish to secure by Letters Patent of the United States—

A buttoner formed out of a single wire, first bent to the shape of the loop and then over upon itself and twisted, forming a shank either with or without a wooden or other handle, substantially as specified.

In testimony whereof I have hereto subscribed my name this 18th day of March, A. D. 1878.

JOSEPH A. SMITH.

Witnesses:
ARBA H. BANNING,
ARTHUR L. BATES.